Sept. 3, 1968 — P. I. VIDAL — 3,400,183

METHOD OF PRODUCING CELLULAR ELEMENTS

Filed Aug. 30, 1963

INVENTOR
PAUL I. VIDAL

BY Cushman Darby & Cushman
ATTORNEYS

| United States Patent Office | 3,400,183 |
|---|---|
| | Patented Sept. 3, 1968 |

3,400,183
METHOD OF PRODUCING CELLULAR ELEMENTS
Paul I. Vidal, Villepinte, France, assignor to Rocma Anstalt, Vaduz, Liechtenstein, a corporation of Liechtenstein
Filed Aug. 30, 1963, Ser. No. 305,858
Claims priority, application France, Sept. 6, 1962, 908,755
2 Claims. (Cl. 264—53)

ABSTRACT OF THE DISCLOSURE

Slab or panel-like molded elements of lightweight cellular phenolic-based thermoset resin having two major (length and width) dimensions and one minor (thickness) dimension, are produced in a mold cavity having a bottom and side walls and an open top, so dimensioned and arranged that the dimensions of the mold cavity corresponding to said major dimensions of the molding extend in a generally vertical plane while the dimension of the mold cavity corresponding to said minor dimension of the molding extends in a horizontal transverse direction, and the moldable composition containing an expanding agent is introduced into the bottom of the mold.

---

This invention relates to the production of low-density molded elements of cellular consistency, and generally of slab-like or panel-like form.

Heretofore such elements have generally been produced by placing a charge of moldable composition containing a suitable expanding agent in a large-sized mold, allowing the reaction to take place, and then removing the hardened cellular mass from the mold and cutting it into panels or slabs of the desired dimensions. Since a thermal reaction is always involved in such a process, it is frequently found that the central portions of the mass is carried during expansion to a different temperature from the side portions in contact with the mold walls. This results in non-uniform expansion. Thus, especially in the case of thermosetting materials when used as the moldable compositions, the outer portions of the mass contacting the mold walls may tend to form a hard crust of comparatively high density while the inner parts are of much lower density with a much greater amount of cells therein, irregularly distributed. The resulting molded slabs or panels are non-uniform and generally unsatisfactory. The surface characteristics of the slabs are poor. Moreover, when the molded mass obtained in the above conventional processes is removed from its mold and cut into slabs, or the like, there is a considerable amount of waste.

Besides, difficulties are experienced in forming a homogeneous mixture of moldable composition and expanding agent so that the composition of the mix will be thoroughly uniformly distributed throughout the volume of a large-sized mold, and such mixing is long and power-consuming.

During the cutting operations, deleterious vapors, toxic and corrosive in character, are released because they could only partially be eliminated during the actual expanding process owing to the large volume of the mass.

Objects of this invention therefore include the provision of an improved method of producing lightweight cellular elements in the form of slabs, panels, and the like, which will be considerably more uniform in their characteristics than similar elements produced by conventional methods, both in regard to the characteristics throughout the extent of each element and to the characteristics of different elements of a batch; to provide such a method which will be more economical to perform in that mixing operations are simplified, and cutting operations are virtually eliminated, the slabs or panels being directly obtained with the desired final dimensions. Other objects will appear.

According to a fundamental feature of the improved process, slab- or panel-like molded elements of lightweight cellular character having two major (length and width) dimensions and one minor (thickness) dimension, are produced in a mold cavity having a bottom and side walls and an open top, so dimensioned and arranged that the dimensions of the mold cavity corresponding to said major dimensions of the molding extend in a generally vertical plane while the dimension of the mold cavity corresponding to said minor dimension of the molding extends in a horizontal transverse direction, and the moldable composition containing an expanding agent is introduced into the bottom of the mold.

In other words the invention utilizes a mold in the form of a relatively narrow and deep open-topped channel or trough of predominantly vertical extent, into the base of which the moldable mix is delivered. It has been found that with such an arrangement the expansion tends to proceed in a much more regular uniform manner than when using a mold cavity of other shape, with the bubbles of gas or vapor rising smoothly and steadily through the mass and escaping from the open top of the mold so as to leave vertical rows of cells in the molded element which tend to be uniformly distributed throughout the element.

According to a further important feature of the invention, a certain prescribed temperature relationship is maintained between the walls of the mold cavity and the moldable mix injected thereinto. That is, it is well-known to keep the temperature of the mold walls at a predetermined value depending on the nature of the mix to be molded, and generally less than 100° C. According then to the stated feature of the present invention, the mix is injected into the cavity at a temperature which is less by a small but definite amount, e.g. about 10° C., than the said wall temperature. It is found that when this prescription of the invention is adhered to, there is present at the outer surfaces of the molding in contact with the mold walls, a very thin but strong crust-like layer which is intimately bonded with the underlying cellular material and provides a highly advantageous surface protection layer greatly enhancing the mechanical characteristics of the molded panels or slabs produced.

The applicants' experiments in this connection have demonstrated that the depth of the crust-like formation and the consequent characteristics of the molded product are directly related to the temperature differential present between the mold walls and the injected mix. When such temperature differential is zero or very small, the crust is totally absent, the molded panel is quite homogeneous in its structure, and its surfaces are smooth but rather fragile. While such panels may be suitable for certain applications, in many important uses of such cellular panels it is very desirable to have a hard case-like surface at the sides of the panel, continuous with and firmly adherent to the underlying cellular material, and this advantageous surface condition can be obtained, according to the invention, by injecting the moldable mix at a temperature somewhat lower, by about 10° C. in most cases, than the temperature of the mold walls.

When the above-mentioned temperature differential is increased above such optimum value, then the thickness of the hard, dense crust soon becomes excessive, the overall lightweight cellular character of the molded element is adversely affected, and moreover this thick crust tends to act as a heat barrier for the inner parts of the molding, which especially in the case of thermosettable compositions reduces the setting rate in said central regions and interferes with the desired cellular structure therein. Furthermore, the bond between the surface crust and the underlying material tends to become weaker and separation can ensue.

The optimum value of the temperature differential used according to the invention will vary somewhat depending on the nature of the compositions used and other factors, but a difference of about 10° C., as indicated above, is found to be very effective in the case of phenol base resins and other ordinarily used thermosettable plastics.

The applicants' investigations have also shown that in the case of thermosettable resins the rate of cellular expansion, depends not only on the initial composition of the mix, but also on temperature and that it tends to increase with temperature increase at a considerably faster rate than does the polymerization rate, for a given initial composition. Since the amount of cells formed tn the mass during setting depends directly on the relationship present between the velocities of expansion and polymerization, it will be understood that by simultaneously controlling the afore-mentioned temperature differential of the invention and the initial composition of the mix used, it is possible to vary both the thickness of the surface crust or case, and the density of the inner regions or core of the panels.

While the teaching of the invention relating to the use of a lower temperature for the injected mix than for the mold walls with the purpose of providing a thin dense surface crust in the resulting moldings may conceivably be applicable to molds of various shapes, it is found that this feature is enormously enhanced when embodied in a molding process employing the open-topped, narrow vertical channel-like mold cavities disclosed earlier herein in connection with the main feature of the invention, because the large-area vertical surfaces at the sides of such a mold, parallel to the direction of escape of the expanding vapors, are inherently favorable to the smooth, formation of an unbroken surface crust of the character described. According therefore to a preferred embodiment of the present invention, the two teachings are applied simultaneously.

The dimensions of the vertical mold of the invention are not critical, but it is preferred that the relatively narrow transverse or thickness dimension should be of the order of one decimeter. In practice, the spacing of the vertical side walls of the mold is preferably made adjustable.

The side surfaces of the improved mold are not necessarily flat vertical surfaces. They may be formed internally with corrugations in any desired direction, or with formations of other shapes, provided the generally vertical extent of said side surfaces, permitting a smooth upward flow of the expanding vapors from the bottom to the open top of the mold is not impaired. In fact the invention has been successfully tested in connection with the molding of cellular channel or conduit elements having curved sides, including tubular pipes. Thus, for producing relatively short pipe sections (less than about 2 meters long), there may be used an open-topped annular or tubular mold disposed with its axis vertical, and the moldable material is injected from the circular base of the mold. In the case of longer cellular conduit elements according to the invention, the mold is preferably arranged with its axis horizontal, and the mix is poured along the lowermost generatrix of the mold and rises over arcuate paths along the curved sides thereof. In this case instead of providing a completely open top for the mold, elongated vent apertures may be provided along the uppermost generatrix of the tubular mold to permit the escape of the expanding gases and excess composition.

If desired a series of separate cellular elements may be molded in a common mold according to the invention. For this purpose it is simply necessary to provide transverse separating walls or partitions across the common mold, at suitably spaced positions along its length, such partitions being made to extend somewhat short of the bottom of the mold so as to ensure uniform distribution of the non-expanded mix at the bottom of the mold. The partitions may also be apertured at spaced points along their height.

A cellular element, produced in accordance with the invention, whether it be in the form of a generally flat panel or slab, or in the form of a pipe or other elongated element, has a highly distinctive appearance which enables its being immediately recognized as having been produced by the process herein described. In the first place, all of its outer sides are smooth due to having been formed in direct contact engagement with mold surfaces, rather than having been sawed or otherwise cut from a large mass or cake of expanded material as is usually the case with similar articles produced by conventional methods. The thin, dense, hard surface crust present at such surfaces, resembling somewhat the outer layer of a case-hardened metal part, is clearly visible on a section of the article and is characteristic of the process described. Further, as earlier mentioned the cells in the modling are distributed rather regularly along rows of lines substantially parallel to one of the major dimensions of the element, thereby providing a distinct contrast with conventionally produced cellular articles, wherein the cells are randomly distributed or tend to be aligned on directions generally normal to the major dimensions of the article when a horizontal mold was used.

Figure 1:
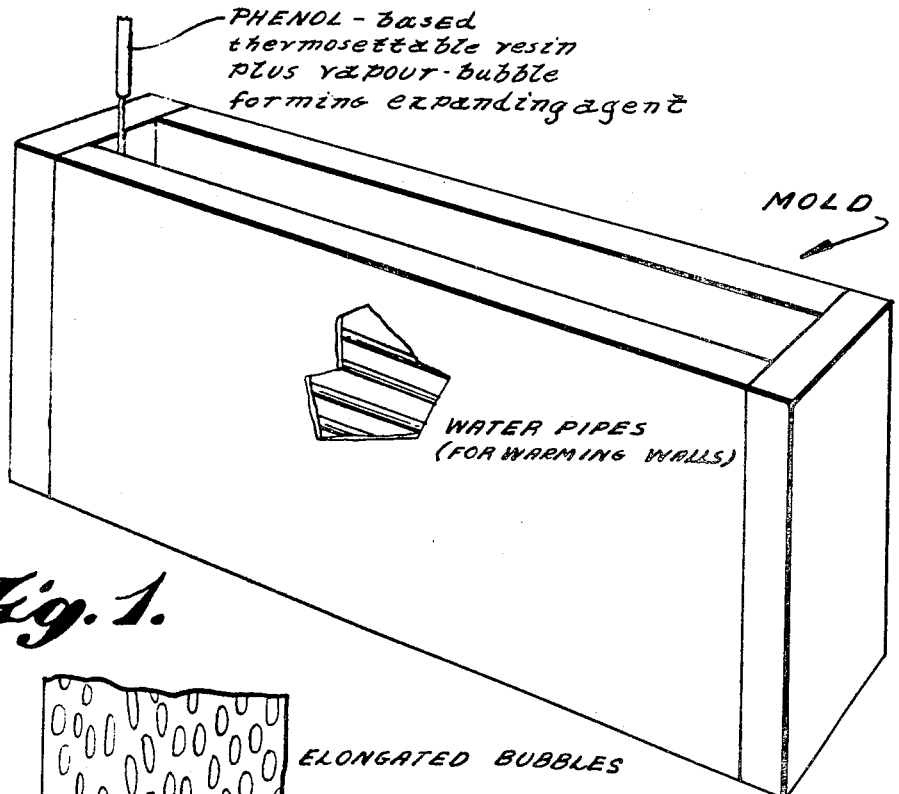
FIGURE 1 is a perspective view of the mold, with a portion broken away to expose heating means.
Figure 2:
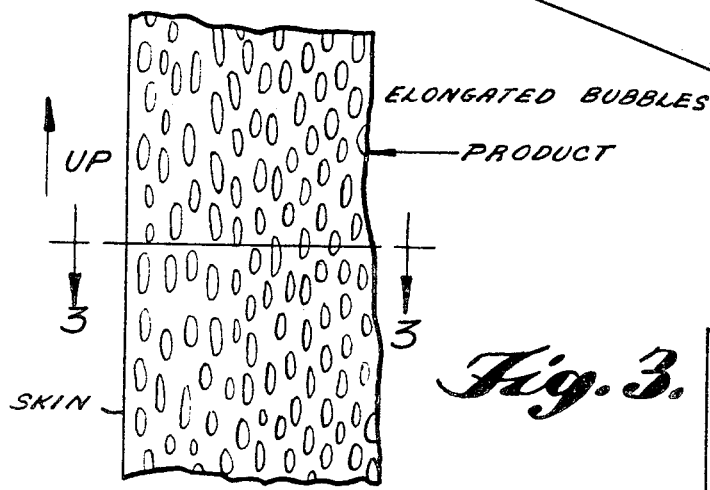
FIGURE 2 is a fragmentary vertical sectional view of a product molded in the mold of FIGURE 1.
Figure 3:
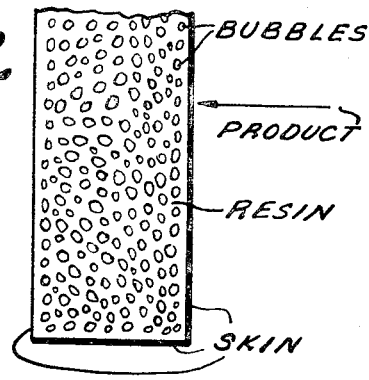
FIGURE 3 is a fragmentary transverse sectional view of the product, taken substantially along line 3—3 of FIGURE 2.

A detailed example will now be described for purposes of illustration but not of limitation, of the procedure used in molding cellular slabs from phenol base resin according to the invention. In this example, there was used a vertical mold of generally rectangular shape 2 meters in length, 1.50 m. in width and 0.10 m. in transverse depth, continuously open at its top. The inner sides surfaces of the side walls were coated with a conventional silicone-base mold-stripping agent and means were provided for maintaining the mold walls at a temperature of about 40 to 45° C.

A mix was prepared from phenol resin and pentane in a weight ratio of 10 kg. resin for 0.8 kg. pentane, to which was added 7% by weight of a 50% aqueous solution of an ordinary commercial inorganic acid. The mix was well stirred, brought to a temperature within the range 30–35° C., and injected into the bottom of the mold. After a period of about 10 minutes the expansion was found to be substantially complete and the expanded material nearly flush with the upper edges of the mold. After a period of about twenty minutes the molded panel was removed from the mold. Its opposite side surfaces were found to be perfectly smooth. A cross section showed the presence of a well-formed and adherent surface crust or skin of dense, hard unexpanded polymer resin about 0.5 mm. thick. Below this crust the panel revealed a light-weight cellular structure with uniformly distributed rows of cells aligned almost exactly parallel to the 1.50 meter dimension of the panel.

When the same procedure was followed except that the mold wall temperature was adjusted to 70° C., with the temperature of the injected resin being still held at 30–35° C., then the surface crust in the molded panel was found to be considerably thicker with a tendency to break away from the main mass of the panel, so that the resulting panels were unsuitable for use as structural elements.

There are several reasons for the tendency of the surface crust to break away from the main mass of the article when the mix is injected into the mold at a temperature considerably lower than that of the mold walls as in the last procedure described. In the first place, during expansion the bubbles of gas tend to rise preferentially along the interface between the hard outer crust and the softer inner material, so that there is created at such interface a zone of reduced density which weakens the bond between crust and core. Moreover, the resin sets very rapidly owing to the higher temperature of the mold walls. The set resin is a poor heat conductor, and together with the aforementioned interface zone of high cellularity constitutes an effective heat barrier retarding the transfer of heat from the mold walls to the core regions of the molded mass. In said core region therefore the mass continues its expansion for a rather long time after the outer crust region has set so that a firm bond therewith fails to become established.

Various departures from the described procedure can of course be made without exceeding the scope of the invention. Thus in a modification the expanding agent used was a mixture of soda bicarbonate and acid. Using the same mold as above described, there was added to the phenol resin mix 5% by weight bicarbonate followed by 25 % of a 50% commercial acid solution. The mix was then stirred and promptly poured into the mold. Expansion occurred very rapidly. In one test where the mold temperature was less than 60° C. with the temperature of the mix being the same as earlier indicated, the resulting panels were similar in characteristics to those obtained in the first test above described, and were satisfactory. In another test the mold temperature was maintained at 70° C. and the crust was again found to be thick and brittle.

Generally speaking, using a phenol resin as the moldable composition, satisfactory results have been obtained when using mold temperatures throughout the whole range from ambient temperature to about 60° C., provided the mix is injected into the mold at a temperature say about 5 to 15° C. lower than the mold temperature used, in accordance with the feature of the invention specified above.

The invention is applicable to a wide variety of moldable plastic materials including both thermosettable and thermoplastic compositions. If thermoplastic compositions are used, it will be understood that provision should be made for cooling the mold in addition to the heating means. In an initial stage, the mold is moderately heated to produce the desired expansion of the expanding agent, and thereafter cooling is applied to set the expanded thermoplastic material.

What I claim is:

1. A method of producing cellular molded elements comprising injecting a moldable composition containing phenol-based thermosettable resin and an expanding agent of the type which forms bubbles of vapour within the composition into the base of a mold cavity in the general form of a narrow and deep open-topped channel while maintaining the temperature of the mold at a temperature in the range from ambient to about 70 degrees C. and maintaining the temperature of the moldable composition at the time of injection at about 10 degrees C. lower than the temperature of the mold.

2. A method of producing cellular molded elements comprising injecting a moldable composition containing a phenol-based thermosettable resin and an expanding agent of the type which forms bubbles of vapour within the composition into the base of a mold cavity in the general form of a relatively narrow and deep open-topped trough wherein the spacing between the inner side surfaces of the mold cavity is of the order of 2 decimeters, allowing the vapors released by said expanding agent to rise along paths generally parallel to the depth dimension of the cavity toward the open top thereof.

References Cited

UNITED STATES PATENTS

| | | | |
|---|---|---|---|
| 2,582,228 | 1/1952 | Brinkema | 264—54 X |
| 2,588,151 | 3/1952 | Nelson et al. | 264—51 X |
| 2,653,139 | 9/1953 | Sterling | 264—54 X |
| 2,789,095 | 4/1957 | Lindvig | 264—54 X |
| 2,957,206 | 10/1960 | Mindick et al. | 264—53 |
| 2,972,170 | 2/1961 | Birckhead et al. | 264—51 X |
| 3,058,162 | 10/1962 | Grabowski | 264—53 |
| 2,296,305 | 9/1942 | Roberts | 264—55 |

FOREIGN PATENTS 579,000  7/1959  Canada.

OTHER REFERENCES

Lever, A. E.: "Expanded and foamed materials," in Plastics, August 1953, p. 276. Copy in 264–51.

Plastics Engineering Handbook, 3rd edition, 1960, chapter 12, "Cellular Plastics," pp. 147–150. Copy in Gp. 150.

Knox, R. E.: "Trouble-shooting guide for molding one-shot resilient polyether foam," Du Pont Foam Bulletin, Nov. 30, 1960, p. 12. Copy in 264–54.

Gould, David F.: Phenolic resins, New York, Reinhold, c. 1959, pp. 177–180 (Reinhold Plastics Applications Series) TP986, G8, G6, c.2 copy in Group 150.

Bender, Rene J.: Handbook of Foamed Plastics, Libertyville, Ill. Lake, c. 1956, pp. 310–311. TP 1183 F6 B2 c.2 Copy in Group 150.

JAMES A. SEIDLECK, *Primary Examiner.*

P. E. ANDERSON, *Assistant Examiner.*